No. 760,059. PATENTED MAY 17, 1904.
C. S. DOLLEY.
ORNAMENTAL GLASS.
APPLICATION FILED OCT. 5, 1901.
NO MODEL.
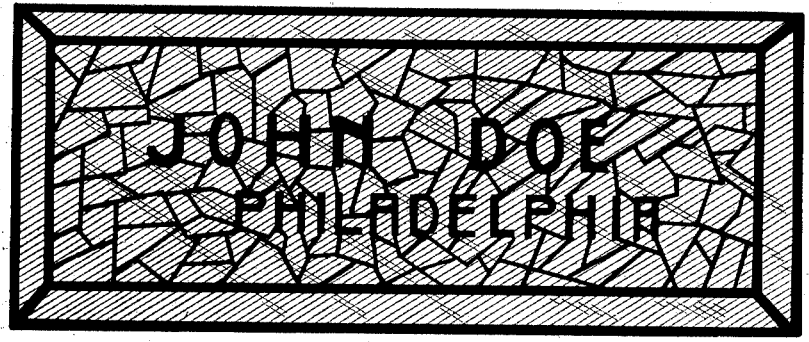
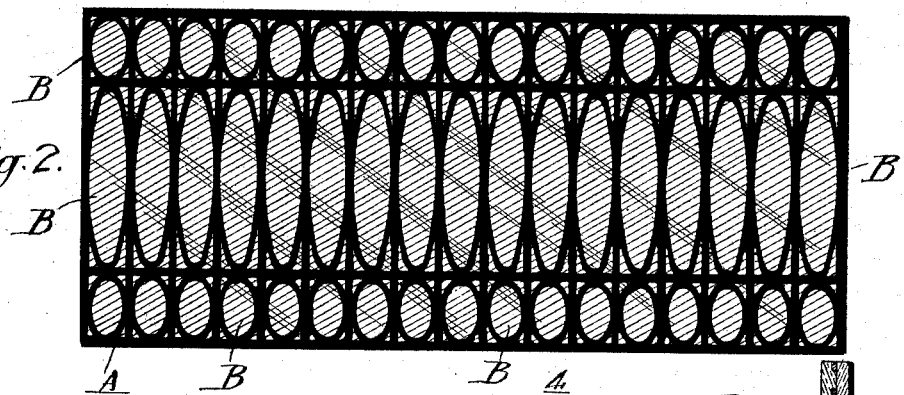
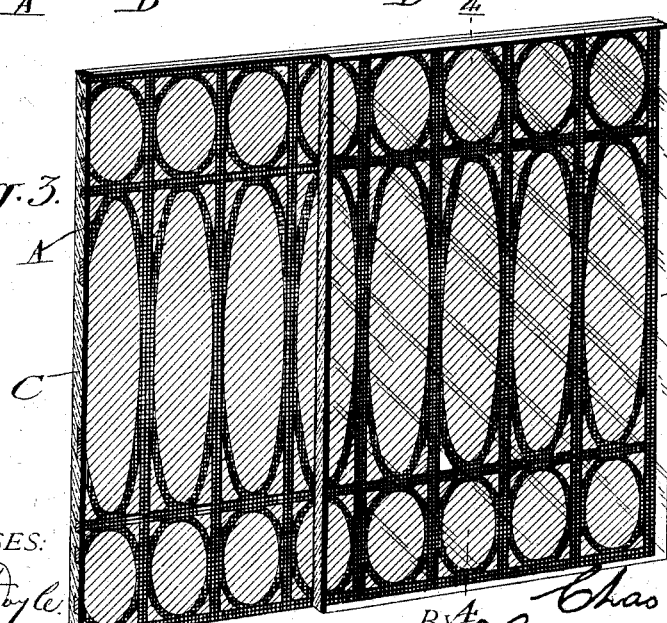
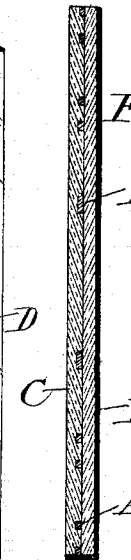

No. 760,059. Patented May 17, 1904.

UNITED STATES PATENT OFFICE.

CHARLES SUMNER DOLLEY, OF PHILADELPHIA, PENNSYLVANIA, ASSIGNOR OF ONE-HALF TO HENRY HESTON BELKNAP, OF PHILADELPHIA, PENNSYLVANIA.

ORNAMENTAL GLASS.

SPECIFICATION forming part of Letters Patent No. 760,059, dated May 17, 1904.

Application filed October 5, 1901. Serial No. 77,736. (No model.)

*To all whom it may concern:*

Be it known that I, CHARLES SUMNER DOLLEY, a citizen of the United States, and a resident of the city of Philadelphia, in the county of Philadelphia and State of Pennsylvania, have invented certain new and useful Improvements in Ornamental Glass, of which the following is a specification.

This invention relates to certain new and useful improvements in ornamental glass adapted for use in windows, skylights, and other analogous purposes; and to this end it consists in the peculiar construction and in the composition, arrangement, and adaptation of parts hereinafter described, shown in the accompanying drawings, and then specifically defined in the appended claims.

The primary object of the invention consists in the construction or production of an ornamental sheet or plate of glass or other vitreous substance having contained within it a continuous ornamental pattern of suitable material, preferably of metal, the same being perforated to form the desired design, the said pattern being combined with the glass or other vitreous material at the time of and while it is being formed into a sheet or plate. The interstices in the pattern permit the glass or other vitreous material to flow or fuse therethrough and form an integral mass. In this manner I form tiles, or sheets, or panes of glass suitable for churches, public halls, and other buildings or places, which will be strong and durable or ornamental, any desired design being produced in a single integral sheet.

The present invention permits use of pattern-sheets of any color, composition, thickness, or design, as well as the use of any suitable glass or other vitreous material, so far as pertains to color, thickness, transparency, or opacity.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a view of a sheet or plate of glass or other vitreous material constructed in accordance with this invention. Fig. 2 is a like view with the transparent glass removed. Fig. 3 is a like view of a portion of a sheet with a portion of the outer or transparent face of glass, the same being shown at the right-hand side of the sheet. Fig. 4 is a section taken on the line 4 4 of Fig. 3.

Reference now being had to the details of the drawings by letter, A designates the pattern or design sheet, which is preferably made of metal, colored to suit the taste, though other suitable materials may be employed; but to carry out my invention in its entirety and prevent fracture of the glass under varying temperatures the said design-sheet should approximately possess the same expansive and contractive qualities as the glass when subjected to heat and cold, respectively, and should be of uniform thickness throughout. As shown in the drawings, this sheet is formed so as to provide a plurality of perforations B.

C is the back or base plate of the glass or other vitreous material, and D the top plate, of clear glass. These three are made integral in the manufacture of the sheet, the glass or other vitreous material filling the perforations and forming anchorages, which secure the opposite halves of the sheet, as shown in the drawings.

The plate C is of opaque glass or other vitreous material of any desired color. The metal sheet is entirely inclosed within and between the backing C and the front plate D and not only gives to the plate or sheet the desired ornamental appearance, but serves to materially strengthen the same.

The advantages of my construction are:

First. The sheets of glass or other vitreous material may be made thinner in case a thin ornamental plate is embedded therein than would be necessary in case a mesh of wire were employed in lieu of the plate on account of the extra thickness of the wire mesh by reason of the nodes of the wire at the points of intersection or crossing of the wire.

Second. The sheets of glass or vitreous material will be made stronger and less liable to break than would similar sheets containing woven wire, because when sheets of perforated metal are employed the sheets of glass and the inclosing bodies of glass are of regular form and tension throughout, whereas when the glass is rolled upon woven wire it assumes the form of a sheet of uneven thickness, so that upon expanding and contracting by varying temperatures the glass often fractures at the thinnest or weakest points, as at the thicker twisted nodes of the wire network.

Third. In the use of perforated sheet of metal such as is employed by me the strains are more uniformly distributed when the glass or other vitreous material solidifies after the rolling operation.

Fourth. When sheets of metal are employed and the sheet of glass or other vitreous material at the back is colored, opaque, or clear and the sheet of glass at the front is clear or uncolored, there appears within the article juxtaposed contrasting metallic and colored or dark surfaces, partaking of the design which was given to the sheet metal when it was perforated. This would not be the effect in any material degree in those cases in which woven wire or wire scrollwork or frames of metal strips set on edge are used.

Having thus described my invention, what I claim as new, and desire to secure by Letters Patent, is—

1. A new article of manufacture consisting of a vitreous body of transparent nature having retained within it a perforated metal sheet of ornamental design and provided at one surface with a composition of colored nature adapted to produce a color contrast with the ornamental device.

2. A new article of manufacture consisting of an integral plate of glass with a colored and a clear surface forming a contrasting background with a perforated metal sheet incorporated between the two surfaces and parallel thereto.

3. A pane or tile consisting of two glass sheets one of which is clear and one colored, and one perforated metal sheet of suitable material disposed between said glass sheets, the said glass sheets being secured to each other by integral anchorages of glass extending through the perforations of the sheet.

4. A new article of manufacture consisting of a metal perforated design-plate, a backing of colored glass or other vitreous material and a face portion of clear glass, the backing and the face portion being united by anchorages of glass lying within the perforations of the design-plate.

In testimony whereof I have signed my name to this specification in the presence of two subscribing witnesses.

CHARLES SUMNER DOLLEY.

Witnesses:
HENRY H. BELKNAP,
RICHARD TAYLOR.